G. WALTHER AND P. W. KLINGER.
FELLY.
APPLICATION FILED NOV. 17, 1919.

1,404,499.

Patented Jan. 24, 1922.
2 SHEETS—SHEET 1.

Inventors
George Walther,
Peter W. Klinger,
By Toulmin & Toulmin,
Attorneys

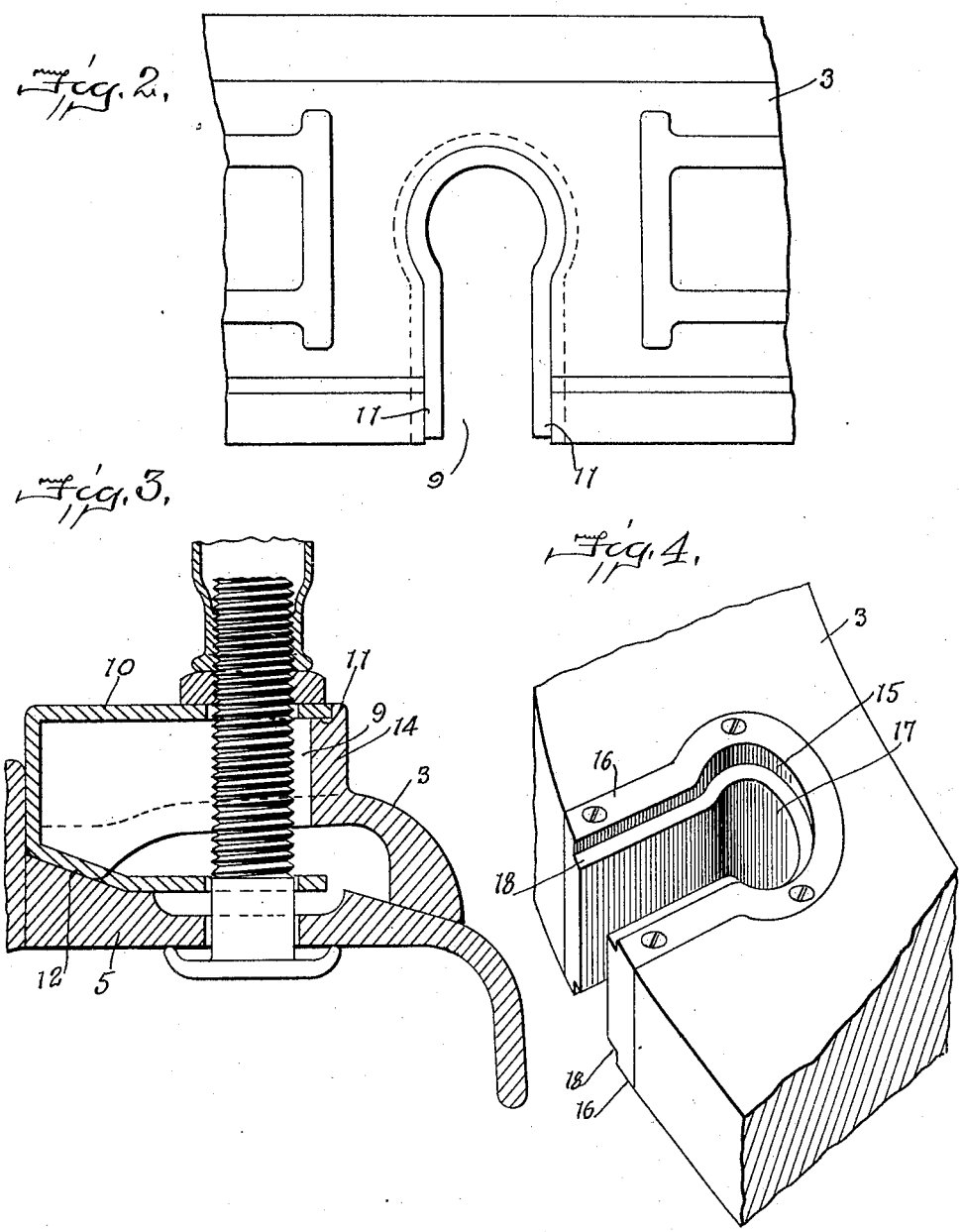

UNITED STATES PATENT OFFICE.

GEORGE WALTHER AND PETER W. KLINGER, OF DAYTON, OHIO, ASSIGNORS TO THE DAYTON STEEL FOUNDRY COMPANY, OF DAYTON, OHIO, A CORPORATION OF OHIO.

FELLY.

1,404,499.            Specification of Letters Patent.      Patented Jan. 24, 1922.

Application filed November 17, 1919. Serial No. 338,575.

*To all whom it may concern:*

Be it known that we, GEORGE WALTHER and PETER W. KLINGER, citizens of the United States, residing at Dayton, in the county of Montgomery and State of Ohio, have invented certain new and useful Improvements in Fellies, of which the following is a specification, reference being had therein to the accompanying drawing.

This invention relates to improved fellies of wheels adapted to have demountable rims fitted with pneumatic tires, mounted thereon, having particular reference to automobiles and motor trucks requiring tires of large size, the invention providing means which makes the mounting of the tires on the wheels less difficult.

The main object of the invention is to overcome the difficulty experienced in mounting heavy tires caused by the protruding valve stem which makes it necessary to lift the tire considerably above the upper edge of the fixed rim or felly of the wheel in order that the valve stem may clear the same and be brought into alinement with the valve stem hole provided for it therein. The first step in the mounting of heavy tires is more or less difficult under any circumstances, but is especially difficult where the mounting of this is done by one man, as lifting the tire above the fixed rim or felly and alining the valve stem with the valve stem hole requires greater strength and skill than the average man has.

We overcome this difficulty, in our present invention, by providing a valve stem slot in the felly or fixed rim, of sufficient width to receive the valve stem freely, and extending from one edge of the rim or felly to substantially beyond its center,—far enough that the valve stem when it is alined in the slot will be centrally of the same.

By this arrangement, as will be readily understood, lifting of the tire and demountable rim above the felly to mount the tire on the wheel is not necessary. To mount a tire on an improved wheel embodying our invention the wheel is jacked up as before, but just sufficient to permit the tire and rim to pass freely under the fixed rim or felly, the wheel is rotated to bring the valve stem slot to the lowest point of the wheel; the inflated tire is then rolled to the wheel, the valve stem being brought into alinement with the slot. The tire may then be raised slightly, or not at all, depending upon the elevation of the wheel, and slid into position over the rim. Thus the mounting of the tire can be accomplished easily and quickly by one man.

In the accompanying drawings we have shown for illustration purposes a well known type of motor truck wheel having our invention applied thereto. Our invention is not limited in its use to our specific type of wheel, but may be used on wheels having either wood fellies or metal fixed rim fellies of any of the types now commercially well known.

In the drawings:

Fig. 2 is a detail view of the fixed rim showing the details of construction of the valve stem slot;

Fig. 3 is a detail view of the valve stem slot shield or guard showing its relation to the valve stem before the tire is mounted on the fixed rim;

Fig. 4 is a detail view showing a slightly modified construction of the invention as applied to a wood felly.

Figure 1:
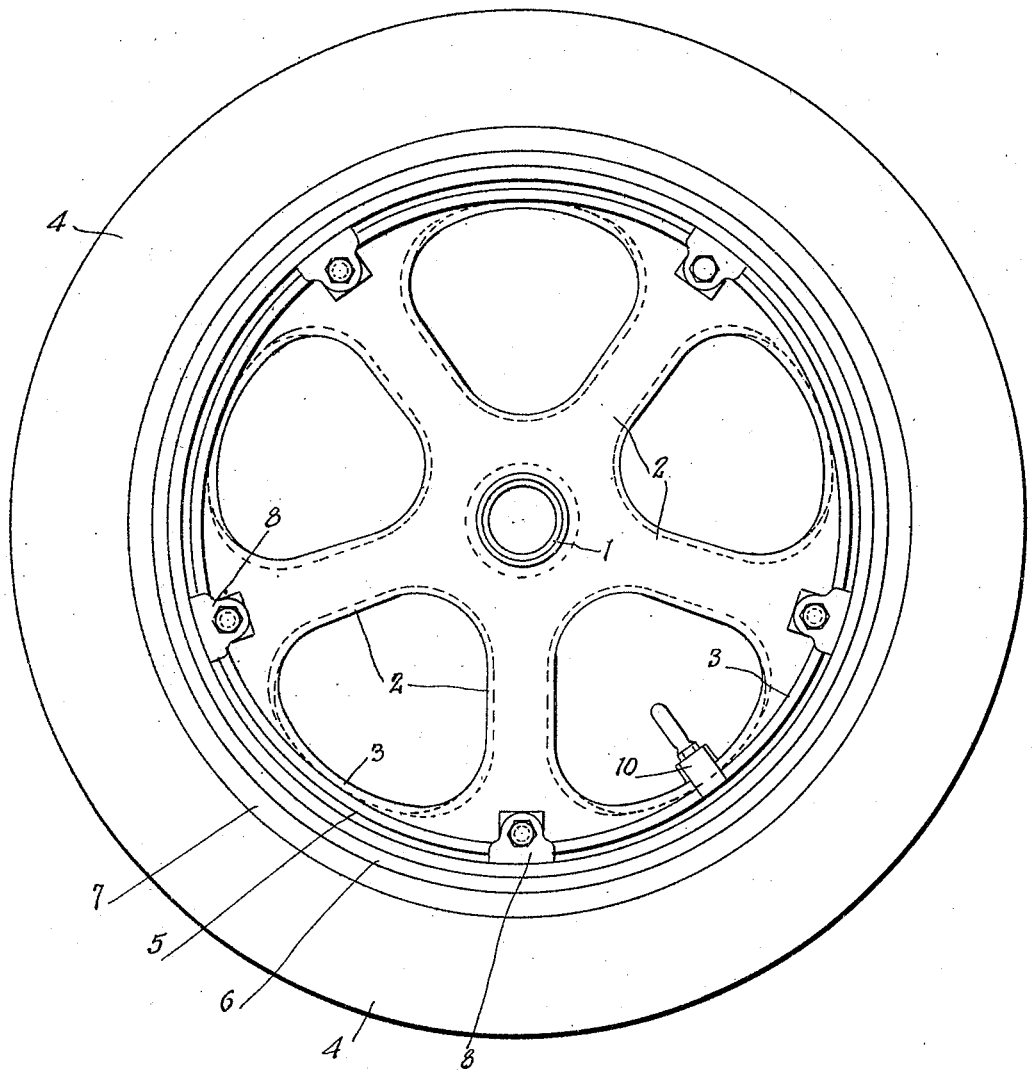
Fig. 1 is a side elevation of a wheel embodying our improved fixed rim and having a tire mounted thereon.

As here shown the wheel embodying our invention consists of the usual hub 1, spokes 2 and fixed rim 3; also the usual mounting of the tire 4 on the continuous one-piece base 5, side ring 6, split locking ring 7 and clamp 8, all of which may be of any of the well known types of construction, the fixed rim 3 only being affected by the application of the invention.

As shown in the drawings the fixed rim is provided with the open valve stem slot 9 extending parallel with the axis of the wheel from a point between the center of the felly and one edge thereof to the opposite edge. A slot guard or shield 10 is preferably used in connection with the valve stem to close the slot to improve the appearance of the construction and to prevent accumulation of dirt therein.

The slot guard 10 may be of any suitable design or shape to cover the slot on both the upper and lower side and at the edges of the fixed rim, or may cover only the open end and upper side of the slot as may be best adapted to the particular construction of the fixed rim to which the invention is applied.

The felly may also be provided with suitable depressions in the upper and lower sides and at the edge thereof to cause the slot guard to come flush or substantially flush at its edges with the adjacent portions of the felly. As here shown such an arrangement consists of the upper depression 11, lower depression 12, and edge depression 13 the upper depression 11 being formed in raised portions 14 of the fixed rim extending substantially above the normal surface of the inner face of the fixed rim. To mount the wheel the slot guard in the form here shown is assembled on the valve stem in the manner shown in Fig. 3.

To apply the invention to wood fellies, the felly is preferably provided with a slot of sufficient dimensions to permit using a metal reinforcing for the slot, illustrated in one form in Fig. 4, having the valve stem slot formed therein and adapted to be secured to the felly in any suitable manner. As here shown the reinforcing member consists of the integral part 15 having upper and lower flanges 16—16 extending over the edges of the adjacent wood and serving as a suitable means for securing the reinforcing metal part to the felly, the part being secured to the wood as here shown by screws. A valve stem slot 17 is formed in the part 15, the metal adjacent the slot on the upper and lower sides and outer end of the reinforcing member being depressed as shown at 18 to receive the slot guard 19 and to cause the same when assembled therein to have its upper surface substantially flush with the adjacent metal.

From the foregoing detailed description the construction and use of our invention will be readily understood and its advantages over the heretofore practice in mounting tires will be appreciated by those experienced in removing and mounting heavy tires of the character herein contemplated. Obvious details of construction and arrangement will, of course, be made to adapt the invention to different types of wheels, but the underlying principle of the invention consisting in providing an open slot in one edge of the felly instead of a hole through the felly as in the present common practice may be applied to various types of wheels in any suitable form without departing from the spirit and purpose of the invention.

Having thus fully described our invention, what we claim as new and desire to secure by Letters Patent, is:—

1. A wheel adapted to have a pneumatic tire mounted thereon and having a felly having an open slot therein and a reinforcing member secured relative to and forming a lining for said slot, and an open slot formed in the reinforcing member to receive the valve stem of said tire.

2. A wheel adapted to have a pneumatic tire mounted thereon and having a felly having a raised portion and an open slot and depressions adjacent the slot formed in said raised portion from one edge of the felly, said slot being adapted to receive the valve stem of the tire mounted on said wheel, and a slot guard secured relative to said depressions substantially flush with the adjacent portions of the felly.

In testimony whereof, we affix our signatures.

GEORGE WALTHER.
PETER W. KLINGER.